United States Patent [19]

Bunn

[11] 3,949,451

[45] Apr. 13, 1976

[54] SAFETY SNAP HOOK ASSEMBLY

[76] Inventor: Hugh Bunn, Box 236, Snow Lake, Manitoba, Canada

[22] Filed: June 7, 1974

[21] Appl. No.: 477,548

[52] U.S. Cl. .............................. 24/241 CH; 182/4
[51] Int. Cl.² ..................... A44B 13/00; A47L 3/04
[58] Field of Search...... 24/73 HH, 73 HR, 241 CH, 24/241 S, 241 PL, 241 PS, 241 P, 231, 234, 235, 232, 233; 182/4

[56] References Cited
UNITED STATES PATENTS

| | | | |
|---|---|---|---|
| 468,213 | 2/1892 | Violett | 24/235 X |
| 526,627 | 9/1894 | Lamplough | 24/232 UX |
| 1,206,620 | 11/1916 | Troop | 24/234 |
| 1,367,241 | 2/1921 | Daubenspeck | 24/241 CH |
| 1,677,814 | 7/1928 | Close et al. | 24/234 |

FOREIGN PATENTS OR APPLICATIONS

| | | | |
|---|---|---|---|
| 528,337 | 7/1955 | Italy | 182/4 |
| 87,797 | 11/1936 | Sweden | 24/241 |
| 896,674 | 5/1962 | United Kingdom | 24/235 |

Primary Examiner—Donald A. Griffin
Attorney, Agent, or Firm—Stanley G. Ade

[57] ABSTRACT

A main hook portion is provided with a D-ring engaging upper area and safety ring engaging lower area. A spring loaded pivoted snap component holds the D-ring in the upper area yet allows a safety ring to be engaged and disengaged from the lower area. In mining, particularly, the D-ring is secured to the miners safety belt and the safety ring to one end of the safety cable anchored to the mine wall or the like.

2 Claims, 4 Drawing Figures

U.S. Patent   April 13, 1976   3,949,451
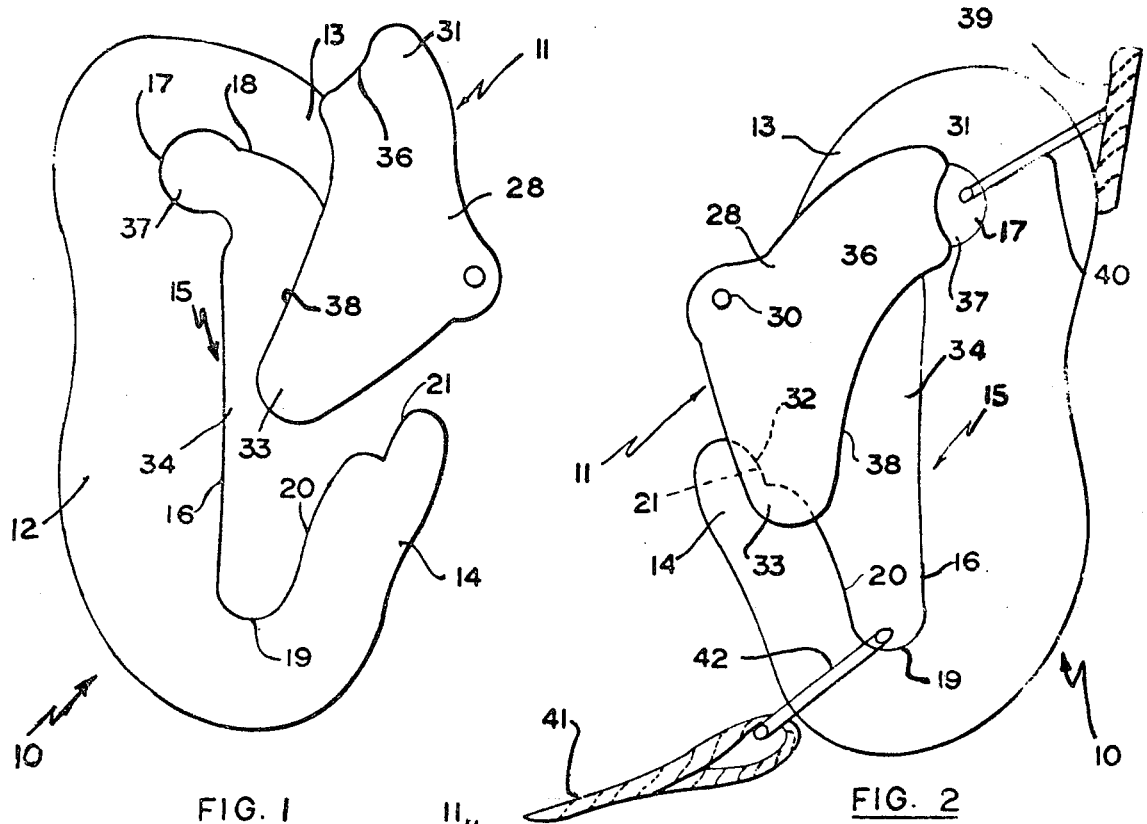
FIG. 1
FIG. 2
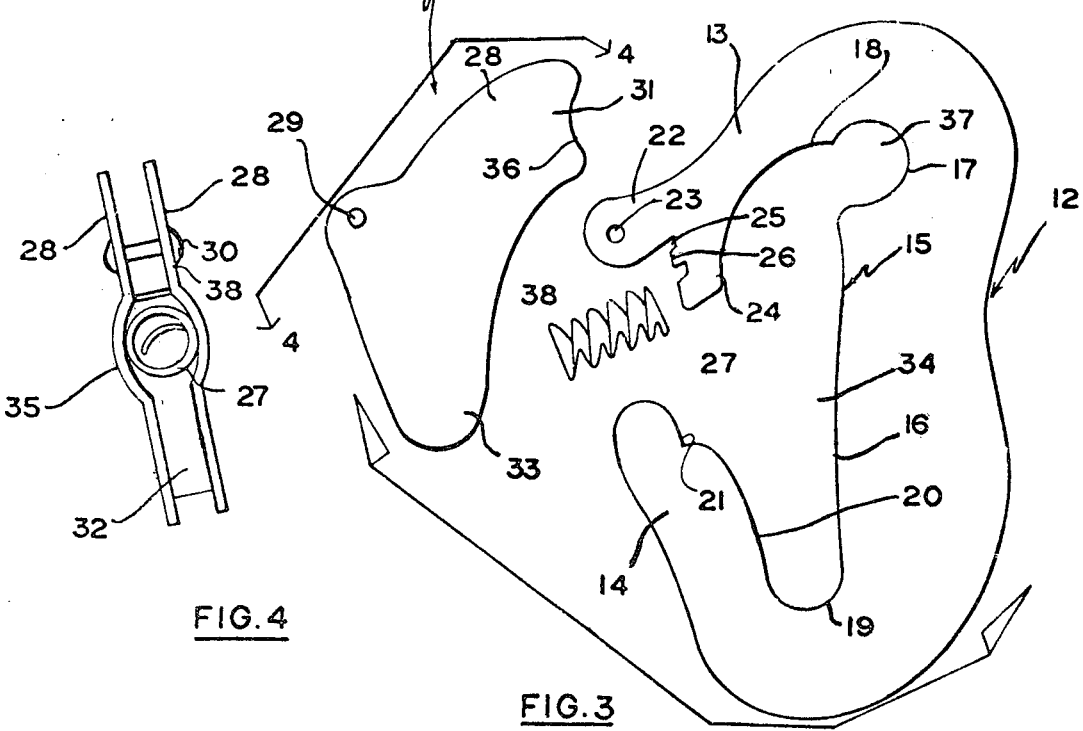
FIG. 4
FIG. 3

SAFETY SNAP HOOK ASSEMBLY

BACKGROUND OF THE INVENTION

This invention relates to new and useful improvements in safety hook assemblies primarily designed for use in mines or the like.

Conventionally when miners are working near holes or forks, they are required to use a safety rope. Such safety ropes are normally anchored by one end thereof to the wall or convenient location in the mine adjacent the hole or fork and are provided with a conventional snap hook assembly upon the other end thereof including a spring loaded jaw which normally holds the snap hook assembly closed.

Miners belts' include a permanently fixed D-ring secured thereto and the miner is supposed to snap the hook into the D-ring when working in dangerous locations such as those above described.

When the hook is disengaged from the miners belt, it is normally dropped upon the ground and due to the high acid content of water, dust and the like normally found in mines, this constant dropping on the ground rapidly deteriorates the spring holding the hook in a closed position.

When a miner encounters a snap hook assembly which is inoperative, he is not supposed to use same but to obtain a replacement. However when working many thousands of feet underground, it is extremely time consuming for the miner to obtain a replacement so that often he attempts to utilize the damaged hook component.

It requires constant checking of all the safety ropes and cables by supervisory personnel in an attempt to maintain the safety hook components in a safe condition. Furthermore when such safety cables or ropes having damaged hook components are replaced, the entire assembly is replaced due to the fact that the hook assembly is permanently secured to one end of the safety cable and rope and this is relatively expensive inasmuch as the average safety cable and hook assembly may cost between 15 and 20 dollars.

SUMMARY OF THE INVENTION

The present invention overcomes all of these disadvantages by providing firstly, a safety hook component permanently secured to the D-ring of a miners belt so that it is always carried with him and is never left lying under conditions such as hereinabove described.

Secondly the safety rope or cable assembly is supplied with a closed ring at the one end thereof which cannot become damaged either by dropping upon the ground or by attack by water, dust and the like normally found in mines.

It will therefore be appreciated that both the snap ring assembly and the safety rope assembly are practically indestructible.

However in order to provide means for readily attaching the safety hook assembly to the D-ring and to attach the safety ring to the safety hook assembly, a new construction of safety hook assembly is required and the present invention relates to this construction.

The principal object and essence of the invention is therefore to provide a device of the character herewithin described which enables a safety hook assembly to be detachably secured to a D-ring attached to a miners belt and then provides means to enable a closed ring on the end of a safety rope or cable to be attached and detached from the safety hook assembly.

Another object of the invention is to provide a device of the character herewithin described in which the hook assembly includes a first D-ring engaging means and a second main ring engaging means all in one body portion.

Another object of the invention is to provide a device of the character herewithin described in which the snap component is adapted to operate both portions of the hook assembly.

Still another object of the invention is to provide a device of the character herewithin described which eliminates or reduces the tendency of miners to ignore safety hook assemblies which might become damaged or inoperative.

Still another object of the invention is to provide a device of the character herewithin described which is simple in construction, economical in manufacture and otherwise well suited to the purpose for which it is designed.

With the foregoing objects in view, and other such objects and advantages as will become apparent to those skilled in the art to which this invention relates as this specification proceeds, my invention consists essentially in the arrangement and construction of parts all as hereinafter more particularly described, reference being had to the accompanying drawings in which:

DESCRIPTION OF THE DRAWINGS

FIG. 1 shows one side elevation of the safety hook assembly with the snap component in the open position.

FIG. 2 is a view reversed from FIG. 1 but showing the snap component in the closed position.

FIG. 3 is an exploded view of the components shown in FIG. 1.

FIG. 4 is an end view of the snap component per se along the lines 4—4 of FIG. 3.

In the drawings like characters of reference indicate corresponding parts in the different figures.

DETAILED DESCRIPTION

Although the present snap hook assembly is designed primarily for use in mines, nevertheless it will be appreciated that it can be adapted for use readily in other locations if desired so that the assembly described and claimed is not limited to use in mining.

Proceeding therefore to describe the invention in detail, reference character 10 illustrates the main body portion of the snap hook assembly and 11 illustrates generally, the snap hook component thereof.

The main body portion is manufactured in a substantially C-shaped configuration having a main portion 12 together with an upper jaw 13 curving over from one end of the main portion 12 and a lower jaw 14 curving upwardly towards the upper jaw 13 but terminating spaced therefrom as clearly shown.

The main body portion includes an inner wall surface collectively designated 15 which in turn includes a main portion 16 and an arcuately curved recess 17 formed at one end of the main inner wall portion 16 as clearly shown. An arcuately curved inner wall portion 18 extends from one end of the arcuately curved recess 17 and terminates in the aforementioned upper jaw 13.

The lower end of the inner wall 16 of the main body portion is curved as illustrated at 19 and then extends upwardly and outwardly at an acute angle as indicated by reference character 20, to terminate in the aforementioned lower jaw 14 and in this regard it should be observed that a shouldered area 21 is formed on the inner wall as clearly shown, the purpose of which will hereinafter be described.

The upper jaw portion 13 is provided with an off-standing mounting end 22 which is apertured as at 23 and extending downwardly from this part 22 is a spring retaining lug portion 24 having an annular recess 25 formed therein with a projecting shoulder 26 over which is seated a compression coil spring 27.

The aforementioned snap component 11 is formed generally of two spaced and parallel plates 28 which are apertured at 29 to receive a pivot pin 30 extending through the plates and through the aforementioned aperture 23 in the portion 22 of the main body portion. This pivot 29 is situated substantially intermediate the ends of the plates 28, the upper portion 31 of which engage one upon each side of the upper jaw 13 as clearly shown.

A plate 32 extends between the other end 33 of the plates 28 and is adapted to engage within the recessed shouldered portion 21 of the lower jaw 14 when the snap component is mounted in positions shown in FIGS. 1 and 2. Under these circumstances spring 27 engages this portion 32 adjacent the upper end thereof and normally biasses the snap component in the closed position relative to the main body portion 10 with the lower portion of plate 32 preventing further outward movement of the snap component from the main body portion. In this connection it should be understood that the snap component may be moved inwardly into the area indicated by reference character 34, against pressure of spring 27. Furthermore the plates 28 may be bowed outwardly as indicated by reference character 35, to form a well within which spring 27 may be seated.

When the snap component 11 is in the closed position illustrated in FIG. 2, the arcuately curved ends 36 of the upper ends 31 of the plates 28 define together with the arcuately curved recess 17 a first ring engaging area designated 37 and the ends 31 of the plate close off this recess from the remainder of the area 34, when the component is closed as shown in FIG. 2.

The remaining part of the area 34 is closed off by the arcuately curved walls 38 of the inner side of the plates 28 and this area 34 defines a second ring engaging portion once again when the snap component is in the closed position.

In operation, reference character 39 illustrates a conventional webbed belt normally worn by miners having a metal D-ring 40 permanently secured thereto and pivoting outwardly therefrom.

The snap component is moved to the open position shown in FIG. 1 against pressure of spring 27 thus enabling the rod of the D-ring to be engaged between the snap component 11 and the lower jaw 14 whereupon it may be moved upwardly to the first ring engaging recess or area 37. Release of the snap component closes same as shown in FIG. 2 thus enclosing the rod of the D-ring and maintaining the hook component upon the belt of the miner until use is required.

When it is required to use the safety rope or cable 41, the closed ring 42 permanently secured to one end of the safety cable is snapped against the snap component 11 which opens same slightly inwardly and away from the jaw 14 against pressure of spring 27 and allows this ring to be seated within the area 34, it being understood that the rod froming the D-ring 40 remains within the recess or area 37.

Removal of the ring 42 is a reversal of the procedure inasmuch as the snap component may be moved inwardly so that the ring 42 can be disengaged. Normally of course the snap hook assembly hangs from the belt of the wearer so that disengagement from the D-ring requires distinct manipulation by the wearer.

Since various modification can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What I claim to be my invention is:

1. A safety snap hook assembly for use in mines or the like in conjunction with a D-ring permanently secured to a miners web belt and a safety ring permanently secured to one end of a safety rope or the like; said assembly including in combination a main body portion and a snap component permanently secured to said body portion adjacent one end thereof, a compression spring co-operating between said one end of said body portion and said snap component normally biassing said snap component to a closed position relative to the other end of said main body portion, first ring engaging means formed in said main body portion and second ring engaging means also formed in said body portion, said snap component normally closing off said first ring engaging means from said second ring engaging means, said main body portion being substantially C-shaped and including an inner wall surface and a pair of jaw portions one at each end of said body portion, said snap component being pivotally secured to one of said jaw portions and normally engaging the other of said jaw portions internally and adapted to be moved inwardly from said second jaw portion against the pressure of said spring means, said snap component including a pair of spaced and parallel plate portions engaged by one end of said plate portions engaging externally one upon each side of said one end of said body portion and being pivotally secured thereto, said one end of said plate portions extending and closing off said first ring engaging means when said snap component is in the closed position, and means between said plate portions remote from said one end thereof engageable with the inner surface of said other end of said body portion to prevent further outward movement of said snap component from said body portion, said plate portions remote from said one end thereof also being situated externally of said body portion.

2. The device according to claim 1 in which said means between said plate portions remote from said one end thereof include a plate spanning between said plate portions remote from said one end of said snap component, one side of said plate engaging said inner surface of said other end of said body portion, the other side of said plate acting as an anchor for one end of said compression spring.

\* \* \* \* \*